(12) United States Patent
Kismir et al.

(10) Patent No.: US 10,087,574 B2
(45) Date of Patent: Oct. 2, 2018

(54) FABRIC WITH WOVEN MARKERS

(75) Inventors: Altay Kismir, Windsor (CA); Willhelm Heinrichs, Wheatley (CA); Brian Parry, Chatham (CA); Keri Kennedy, Chatham (CA); Kevin Smith, Tilbury (CA)

(73) Assignee: AUTOLIV DEVELOPMENT AB, Vargarda (SE)

( * ) Notice: Subject to any disclaimer, the term of this patent is extended or adjusted under 35 U.S.C. 154(b) by 1342 days.

(21) Appl. No.: 12/601,450

(22) PCT Filed: May 24, 2007

(86) PCT No.: PCT/SE2007/000501
§ 371 (c)(1),
(2), (4) Date: Jan. 14, 2010

(87) PCT Pub. No.: WO2008/143557
PCT Pub. Date: Nov. 27, 2008

(65) Prior Publication Data
US 2010/0173137 A1    Jul. 8, 2010

(51) Int. Cl.
| | |
|---|---|
| *B32B 3/10* | (2006.01) |
| *D06H 1/04* | (2006.01) |
| *B26D 5/00* | (2006.01) |
| *D03D 1/02* | (2006.01) |
| *D03D 15/00* | (2006.01) |
| *B26D 5/32* | (2006.01) |
| *B60R 21/235* | (2006.01) |

(52) U.S. Cl.
CPC ............. *D06H 1/04* (2013.01); *B26D 5/007* (2013.01); *D03D 1/02* (2013.01); *D03D 15/00* (2013.01); *D03D 15/0033* (2013.01); *B26D 5/32* (2013.01); *B60R 2021/23547* (2013.01); *D10B 2401/14* (2013.01); *D10B 2505/124* (2013.01); *Y10T 428/2481* (2015.01)

(58) Field of Classification Search
CPC .................... Y10T 428/24; Y10T 428/249921
USPC .......................................... 442/181; 428/196
See application file for complete search history.

(56) References Cited

U.S. PATENT DOCUMENTS

| | | |
|---|---|---|
| 6,932,120 B2 | 8/2005 | Busskamp et al. |
| 2002/0108550 A1 | 8/2002 | Segars et al. |
| 2002/0140218 A1* | 10/2002 | Beasley, Jr. ................. 280/743.1 |

(Continued)

FOREIGN PATENT DOCUMENTS

| | | |
|---|---|---|
| FR | 2708731 A1 | 2/1995 |
| WO | WO 2006011381 A1 * | 2/2006 |

*Primary Examiner* — Peter Y Choi
(74) *Attorney, Agent, or Firm* — Stephen T. Olson; Harness, Dickey & Pierce, P.L.C.

(57) ABSTRACT

Markings visible by automatic optically guided cutting equipment are provided in a fabric such as a double layer fabric for one-piece-woven air bags by groups of black marker weft yarns which contrast with the other (white) weft yarns and warp yarns. The marker weft yarns emerge onto the upper face of the fabric only in predetermined marker areas spaced apart in the warp direction by other white weft yarns to afford optically identifiable markings spaced apart along said weft yarns and spaced apart along the direction of the warp yarns. The arrangement avoids the need for black warp yarns and thus avoids the inconveniences and loom down-time associated with required alterations to the locations of such optically detectable marker areas in the fabric web.

1 Claim, 2 Drawing Sheets

(56) References Cited

U.S. PATENT DOCUMENTS

2006/0284402 A1   12/2006  Hill
2007/0040368 A1*  2/2007  Manley ...................... 280/743.2
2008/0308172 A1* 12/2008  Terashima ................ 139/420 R

* cited by examiner

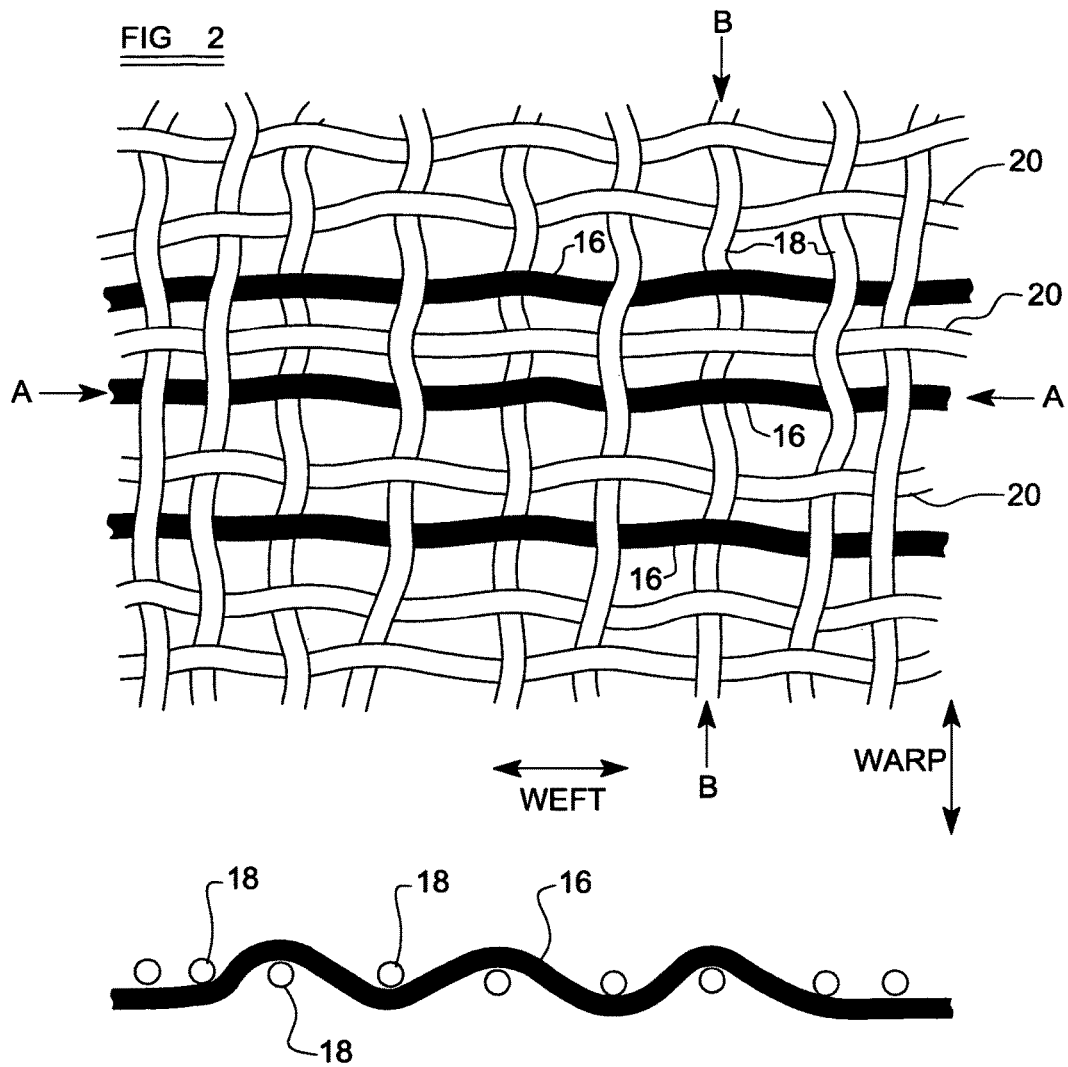
FIG 2
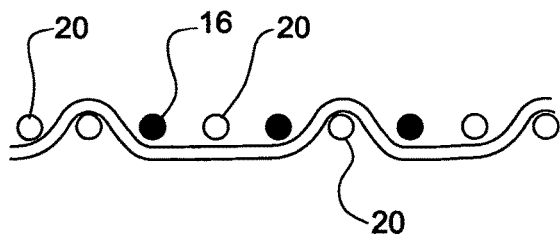
FIG 3
FIG 4 ns of warps.
FABRIC WITH WOVEN MARKERS

CROSS-REFERENCE TO RELATED APPLICATIONS

This application is a 371 U.S. National Stage of International Application No. PCT/SE2007/000501, filed May 24, 2007, and published in English Nov. 27, 2008, the disclosures of which are incorporated herein by reference.

FIELD

THIS INVENTION relates to the manufacture of vehicle safety air bags, and, more particularly, to the manufacture of fabric for such air bags. The invention is of particular, but not exclusive, utility in relation to the manufacture of fabric for air bags of the one piece woven type.

BACKGROUND

For efficient manufacturing of air bags, automatic cutting of webs of airbag fabric into desired shapes and sizes is required. In some apparatus for such automatic cutting, an automatic optical reading system, (herein also referred to as an automatic vision system), is used to read markings on the fabric to allow the apparatus to determine where to cut the fabric. The apparatus may cut the fabric using a cutting laser, for example. Such markings may comprise different weaving patterns, for example, utilising differently coloured yarns. U.S. Pat. No. 6,932,120 describes a marking method where groups of warp and groups of weft yarns are coloured to create patches, where they cross, that are readable by optically based guide systems controlling the cutting of the web, such patches forming datum markings or reference positions on the basis of which the automatic cutting equipment establishes where the fabric should be cut.

In such a known method for providing datum markings for recognition by optical reading and guiding means for cutting equipment using the intersections between groups of coloured (e.g. black) warp and weft yarns, the coloured warp yarns can be set up with the other warp yarns in the warp beam in the weaving loom, or alternatively, the coloured yarns can be fed from separate small creels. However, using coloured warp yarns in this way presents problems. Thus, each air bag design may require different positions of coloured warp yarns specific to the air bag geometry and thus different desired locations of the datum markings formed where the coloured weft yarns cross the coloured warp yarns.

Therefore, at every design change, the position of the coloured warp yarns may have to be changed, resulting in production down time.

Furthermore, discrimination by an automatic vision system between areas where groups of dark warps cross groups of dark wefts, on the one hand and between areas where groups of dark warps or wefts cross white wefts or warps respectively may not be entirely reliable and product may be lost as a result.

A number of special weave patterns have been developed in the past to locate datum or reference points for cutting without the use of contrasting colour yarns. These special weave patterns utilise different light reflection properties of different weaves to aid the vision system. Such arrangements, however, have proved unsuccessful for automated cutting systems. Existing optical detection systems are unable reliably to recognise such weave patterns consistently.

It is known to manufacture vehicle air bags by weaving a fabric in such a way that, over selected regions of the fabric, the fabric is woven in two layers with the warps and wefts of each layer being distinct from the warps and wefts of the other layer except in regions where the warps of both layers are interwoven with the same group of wefts and, conversely except in regions where the wefts of both layers are interwoven with the same groups of warps. The fabric thus woven is produced, as in any other commercial weaving process, as a continuous web and individual air bags are subsequently formed from the web by cutting the web along predetermined lines which are, for the most part, within the regions where the warps and wefts of both layers combine. Such air bags are herein referred to, for convenience as OPW air bags.

SUMMARY

It is an object of the present invention to provide an improved fabric for air bags, such as OPW air bags, which avoids or mitigates the above disadvantages.

According to the invention there is provided a fabric web in which markings visible by automatic cutting equipment are provided by yarns of a colour contrasting with the colour (herein referred to as the majority colour) of the majority of the yarns making up the fabric, characterised in that said markings are provided by marker weft yarns of said contrasting colour, without relying upon warp yarns of other than said majority colour, said marker weft yarns, or groups of said marker weft yarns, being provided at predetermined locations spaced apart in the warp direction by weft yarns of said majority colour, said marker weft yarns being so woven into the fabric as to be visible from one side of the fabric in predetermined marker areas of the fabric and substantially invisible or less visible in the rest of the fabric to afford, by said marker areas, optically identifiable markings which are spaced apart along the warp and weft directions and wherein the extent of each said optically identifiable marking in terms of numbers of warps and wefts is small in relation to the number of warps across the fabric web and the number of wefts between one said marking and the next, reckoned in the warp direction, and wherein each said group of marker weft yarns extends through a respective said marker area or through several said marker areas at the same position along the fabric web and spaced apart across the fabric web.

Embodiments of the invention are described below by way of example with reference to the accompanying drawings in which:

BRIEF DESCRIPTION OF THE DRAWINGS

FIG. 2 is a view to an enlarged scale of part of the fabric of FIG. 1 in the region of such a marker, FIG. 3 is a schematic view in section along the line A-A in FIG. 2, and FIG. 4 is a schematic view in section along the line B-B in FIG. 2.

DETAILED DESCRIPTION

Figure 1A:
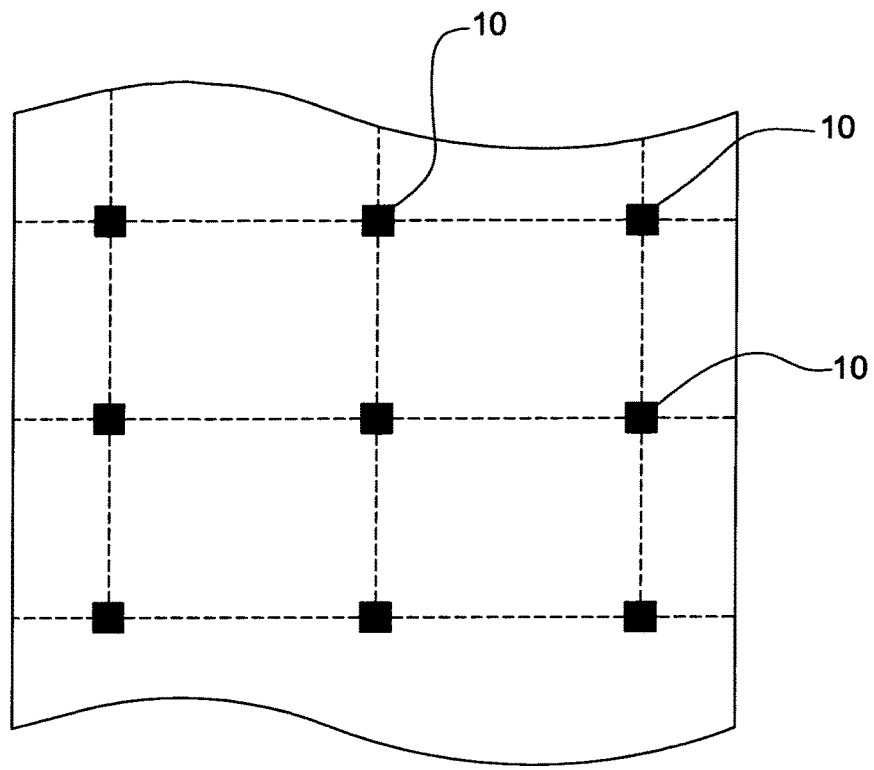
FIG. 1A shows schematically a section of a fabric web embodying the invention with optically detectable markers forming datum points for optical cutter guiding apparatus.
Figure 1B:
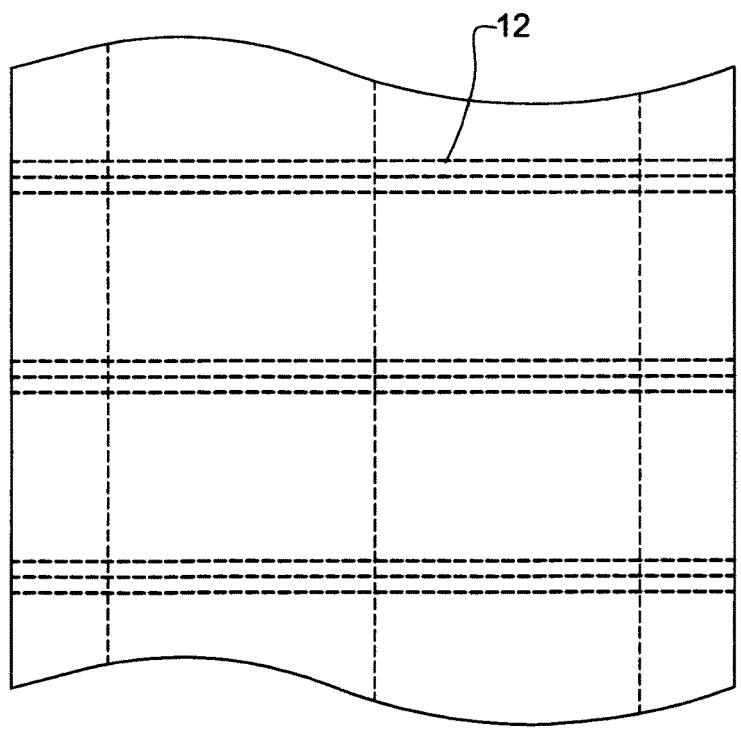
FIG. 1B is a view corresponding to FIG. 1A showing the opposite face of the web from that shown in FIG. 1A.

The woven fabric web to which the drawings relate is of the kind used in the manufacture of vehicle safety air bags, of the one piece woven (OPW) type, the fabric being woven as a continuous web in such a way that, over selected regions of the fabric, some of which regions at least are destined to provide opposite sides of a respective air bag, the fabric is woven in two layers with the warps and wefts of each layer being distinct from the warps and wefts of the other layer, whilst in other regions the warps of both said layers are interwoven in a single layer with the same group of wefts and, conversely the wefts of both layers are interwoven with the same groups of warps. The fabric thus woven is produced, as in any other commercial weaving process, as a continuous web and individual air bags are subsequently formed from the web by cutting the web along predetermined lines which are, for the most part, within the regions where the warps and wefts of both layers combine. Such a fabric is herein referred, for convenience, as an OPW fabric. In FIGS. 1A, 1B and 2, the warps extend vertically, from top to bottom of the figures and the wefts extend horizontally from side to side.

Referring to FIG. 1A, a woven fabric web in accordance with the invention has, on one face of the web, (normally the upper face where an electronic camera, for example, is used as an optical detecting means for guiding cutting means for cutting the air bags from the web), a plurality of relatively widely spaced dark rectangles or "floats" 10 in the lighter coloured remainder of the web. On the reverse of the web, as shown in FIG. 1B, at the location, along the web, of the dark floats on the other side, are transverse dark bands 12 running in the weft direction.

The fabric illustrated is intended to be cut into pieces for air bags using automatic cutting apparatus of the kind referred to above, incorporating a vision system comprises a camera which picks up the contrast between the white and the black yarns. Software in a computer controlling the apparatus dictates how the cutter moves, (for example along the contour of an air bag piece or cell) and the camera is used for fine adjustments. The cutter may cut straight through the fields or floats in which black yarns are exposed to view, or may cut the fabric at a distance from the floats of black yarn if the apparatus is programmed to do so. The cuts should preferably be made in a single layer area of the fabric, (and not, of course, in the air bag cells).

The fields or "floats" in which black yarns are exposed to view are preferably square or rectangular but may have other shapes. Square or rectangular shapes have proven to be easiest to read for typical vision system cameras.

Referring to FIG. 2, which shows, to an enlarged scale, and somewhat schematically, an area of the fabric including one of the dark floats 10, a group of black marker weft yarns 16 is, over the central area of the figure, interwoven with white warp yarns 18, with respective black weft yarns 16 interposed between the white weft yarns 20 in this central area and with each black weft yarn 16 following the same path between the warps as an adjacent white weft yarn. To the left and right of the central area (as viewed in the drawings) and as also illustrated in FIG. 3, the black yarns 16 drop below all of the white yarns 18, 20 in the upper layer of the fabric to form part of the weft yarns in the adjoining lower layer, as also, of course, do half of the white weft yarns 20 outside of the area illustrated in FIG. 2, to form the respective lower layer with the respective white warp yarns of that lower layer. It will be understood, of course, that in the same way, warps 18 which are woven into a single layer in the central area in FIG. 2 may diverge into upper and lower woven layers away from such single layer regions in either direction in which the warps extend.

It will be understood from the above that, assuming the fabric to be tightly woven, (the warp and weft yarns are shown as being relatively widely spaced in FIGS. 2, 3 and 4 only for the sake of clarity of illustration), the black yarns are only visible from the upper surface of the fabric in regions such as the central region in FIG. 2, where they are exposed on the upper surface of the fabric, and that it is these regions which provide the dark "floats" referred to and shown in FIG. 1A for example. In the fabric described with reference to FIGS. 2 to 4, the "floats" are the areas where the black weft yarns 16 extend through a region where the fabric is in a single layer, and it is in these regions that the dark "floats" appear.

It will be understood that there may be more (or fewer) than the three black yarns illustrated in each band of black weft yarns and that the area which is to form the respective dark "float" may incorporate more or fewer warps than indicated in FIG. 2. In a particularly preferred arrangement, there are five black weft yarns in each band of black weft yarns and in this case a respective white weft yarn may again be interposed between each black weft yarn and the adjacent black weft yarn. In the latter case, to secure substantially square markings or floats each marking may comprise nine warps (with each said marking comprising five black yarns with four intervening white weft yarns). To secure oblong markings fewer (or more) warps may be used in each marking.

In the arrangement described with reference to FIGS. 2 to 4, the black yarns are woven into the fabric independently of the regular white yarns which means that the weaving of the regular white yarns is not varied in the region of the dark float despite the presence of the black weft yarns. In the preferred embodiment the weaving comprises one float in warp and weft direction, as shown in FIGS. 2 to 4. In other embodiments the weaving could be different.

Thus it will be understood by those in the art that the weave may be more complex than that illustrated, (and will, of course, be much closer) provided that isolated floats are readily locatable by an optical vision system. Thus, whilst in FIG. 2 each black weft follows the same path through the warps as an adjoining white weft, any convenient weave may be adopted which results in discernibly darker marker patches, for example the black warps may be arranged in pairs, the warps of which alternate in their passages over and under the respective warps and so on. However it is preferable not to have all the of the weft yarns in a "float" region black, (which would enhance visibility), because, in practice, the black yarn is weaker and more expensive than the white yarn. As little black yarn as possible is preferred.

In one embodiment tested by the applicants, each square field or float is 2 mm×2 mm wide and each field comprises weft yarns in the order black-white-black-white-black. Thus, each field or float is five weft yarns wide. To create a rectangle, 2 mm (warp) by 3 mm (weft), the yarns may be arranged black-white-white-white-black-white-white-white-black in the weft direction and may be arranged as for the square field in the warp direction. A rectangular-shaped field (float) is preferred.

Where the fabric is an OPW fabric, the black yarns are preferably woven into a single-layer fabric area (an area where the OPW fabric is woven together, between or outside the air bag cells). It is possible to weave the black yarns into an upper layer in a double layer region of the fabric, with, for example, the black warp yarns hanging loosely, between the layers, i.e. within the air bag cell, in the region between "floats".

Whilst, for simplicity, the bands of contrasting wefts have been referred to in the above as black, with the remaining wefts and the warps being referred to as white, it will be understood that, for purposes of optical detection, the colour scheme might be reversed and/or the major yarns, on the one hand, and the marker wefts, on the other, may be of any colours which afford the necessary optical contrast between the marker wefts and the other yarns. However, because of the increased cost and reduced strength of dyed or pigmented yarns, it is preferred, as noted above, to minimise the proportion of dark yarns used.

The invention may also be applied to single layer fabric adapted to be cut into predetermined shapes by automatic optically steered cutting equipment. In such a base, it may be necessary for the black warps to hang loosely on the underside of the fabric between dark floats.

Whilst the invention has been described as applied to the manufacture of air bags, it will be understood that the invention may also be applied to methods of producing other items from woven fabric where the appearance of the fabric is not of primary importance.

When used in this specification and claims, the terms "comprises" and "comprising" and variations thereof mean that the specified features, steps or integers are included. The terms are not to be interpreted to exclude the presence of other features, steps or components.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

The invention claimed is:

1. A fabric web comprising:
a first plurality of yarns having a majority colour;
a second plurality of yarns having a contrasting, minority colour that contrasts with the majority colour of the first plurality of the yarns; and
a plurality of optically identifiable discrete markings provided by groups of marker weft yarns of the contrasting colour, the groups of marker weft yarns provided at predetermined locations spaced apart in a warp direction by weft yarns of the majority colour, the marker weft yarns woven into the fabric web so as to be visible from an upper side of the fabric only in predetermined marker areas of the fabric web to define the optically identifiable discrete markings which are spaced apart along the warp and weft directions,
wherein each group of marker weft yarns extends through at least one respective marker area at a same position along the fabric web and spaced apart across the fabric web,
wherein the fabric web is a one-piece woven fabric web that includes a single layer region and a double layer region;
the double layer region has upper and lower layers;
and the second plurality of yarns are woven into the upper layer of the double layer region of the one-piece woven fabric web and hang loosely between the upper and lower layers in a region between the optically identifiable discrete markings, and
wherein the second plurality of yarns are not woven into the lower layer in the region between the optically identifiable discrete markings.

* * * * *